Patented Jan. 11, 1944

2,338,728

UNITED STATES PATENT OFFICE 2,338,728

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application September 27, 1941, Serial No. 412,684

12 Claims. (Cl. 260—152)

This invention relates to new azo compounds and their application to the art of dyeing or coloring. Textile materials such as organic derivatives of cellulose, wool, silk, "Nylon," and "Vinyon," and lacquers composed of cellulose esters, cellulose ethers, and vinyl derivatives, for example, can be colored. Coloration can be effected by dyeing, printing, stenciling, or other suitable methods.

Typical organic derivatives of cellulose include the hydrolyzed as well as the unhydrolyzed cellulose organic esters, such as cellulose acetate, cellulose formate, cellulose propionate, or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose, or benzyl cellulose. While our invention will be illustrated more particularly in connection with the coloration of cellulose acetate, a material to which the invention is especially adapted, it will be understood that it applies equally to the coloration of the other materials mentioned herein.

It is an object of our invention to provide a new class of azo dyes. Another object of our invention is to provide colored textile materials having good fastness properties, especially with respect to light and washing. A further object is to provide a process for the coloration of textile materials such as organic derivatives of cellulose, wool, silk, "Nylon," and "Vinyon" textile materials.

The azo compounds of our invention by means of which the above objects are accomplished or made possible consist of the azo compounds having the formula:

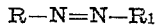

wherein R stands for a member selected from the group consisting of a benzene nucleus, a naphthalene nucleus, an azobenzene nucleus, a benzothiazole nucleus, and a benzoxazole nucleus, and $R_1$ represents a member selected from the group consisting of a β-ketocyclobutylsulfone nucleus, a β-ketocyclobutylsulfoxide nucleus, a β-ketocycloamylsulfone nucleus, and a β-ketocycloamylsulfoxide nucleus.

While our invention relates broadly to the azo compounds having the above formula, it relates more particularly to the azo compounds having the formulas:

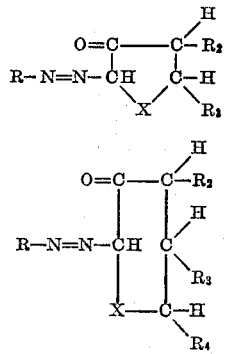

wherein R stands for a member selected from the grop consisting of a benzene nucleus, a naphthalene nucleus, an azobenzene nucleus, a benzothiazole nucleus, and a benzoxazole nucleus, $R_2$, $R_3$, and $R_4$ each represents a member selected from the group consisting of hydrogen and an alkyl group, and X stands for a member selected from the group consisting of

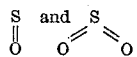

Normally, the β-ketocyclobutylsulfone, β-ketocyclobutylsulfoxide, β-ketocycloamylsulfone, and β-ketocycloamylsulfoxide nuclei are unsubstituted. Generally speaking, when the dye compounds are to be used for coloring organic derivatives of cellulose, especially cellulose acetate silk, R is advantageously a nuclear non-sulfonated benzene nucleus.

The azo compounds of our invention can be prepared by coupling diazotized aminobenzene, amnionaphthalene, aminoazobenzene, aminobenzothiazole, and aminobenzoxazole compounds with a β-ketocyclobutylsulfone, a β-ketocyclobutylsulfoxide, a β-ketocycloamylsulfone, and a β-ketocycloamylsulfoxide compound having no substituent which would prevent coupling.

For purposes of clarity, the nuclei of the coupling components employed by us are depicted structurally. The numbering is that which will be employed herein. Coupling is believed to take place in the 2 position.

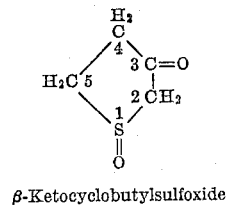

β-Ketocyclobutylsulfoxide

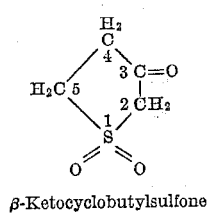

β-Ketocyclobutylsulfone

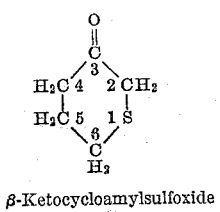

β-Ketocycloamylsulfoxide

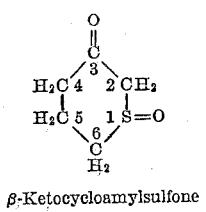

β-Ketocycloamylsulfone

The azo compounds of our invention containing no nuclear sulfonic acid group possess application for the coloration of organic derivatives of cellulose, wool, silk, "Nylon," and "Vinyon." Preferably when organic derivatives of cellulose are to be colored, the dye compounds employed should contain no nuclear carboxylic acid group in either its free acid or salt form. Nuclear sulfonated compounds and those containing a carboxylic acid group can be used to color silk, wool, casein wool, cotton, and viscose textile materials.

The following examples illustrate the preparation of the azo compounds of our invention:

*Example 1*

One gram mole of o-anisidine is diazotized in known fashion, and the diazonium compound obtained is added to a cold aqueous sodium carbonate solution of one gram mole of β-ketocyclobutylsulfone. The coupling reaction which takes place is completed by adding acetic acid to the reaction mixture. The dye compound formed is recovered by filtration, washed with water, and dried. It colors cellulose acetate silk, wool, silk, "Nylon," and "Vinyon" greenish-yellow shades.

An equivalent gram molecular weight of p-anisidine, m-anisidine, or o-phenetidine can be substituted for the o-anisidine of the example to obtain dye compounds which similarly color the materials above named greenish-yellow. The dyes of this example are also valuable for the coloration of cellulose derivative lacquers and polyvinylacetal lacquers.

*Example 2*

One gram mole of 1-amino-2-nitro-4-chlorobenzene is diazotized, and the diazonium compound obtained is added to a cold dilute hydrochloric acid suspension of one gram mole of β-ketocycloamylsulfoxide. Upon completion of the coupling reaction which takes place, the dye compound formed is recovered by filtration, washed with water, and dried. The dye compound obtained colors cellulose acetate silk greenish-yellow shades.

*Example 3*

One gram mole of diazotized 1-amino-2,4-dinitrobenzene is coupled in a cold dilute hydrochloric acid medium with one gram mole of β-ketocyclobutylsulfone. The dye compound obtained colors cellulose acetate silk yellow.

An equivalent gram molecular weight of β-ketocyclobutylsulfoxide can be substituted for the coupling component of the example to obtain a dye which similarly colors cellulose acetate silk yellow.

*Example 4*

One gram mole of diazotized p-amidodimethylaniline is coupled in accordance with the procedure described in Example 1 with one gram mole of β-ketocycloamylsulfone. The dye compound obtained colors cellulose acetate silk red shades.

*Example 5*

One gram mole of 1-amino-2-nitro-4-chlorobenzene is diazotized, and the diazonium compound obtained is added to a cold dilute hydrochloric acid suspension of one gram mole of β-ketocyclobutylsulfone. Upon completion of the coupling reaction which takes place, the dye compound formed is recovered by filtration, washed with water, and dried. The dye compound obtained colors cellulose acetate silk greenish-yellow shades.

*Example 6*

One gram mole of diazotized 1-amino-2-nitro-4-methoxy-benzene is coupled as described in Example 5 with one gram mole of β-keto-5-methylcyclobutylsulfone. The dye compound obtained colors cellulose acetate silk orange yellow.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 6, inclusive. The dye compounds indicated hereinafter likewise color wool, silk, "Nylon," and "Vinyon" generally similar shades as indicated for cellulose acetate silk.

wool, and casein wool, for example, yellow shades. The dye of this example can also be "chromed" if desired.

| Amine | Coupling component | Color |
|---|---|---|
| o-Anisidine | (1) β-Ketocyclobutylsulfone | Green-yellow. |
| Do | (2) β-Ketocyclobutylsulfoxide | Do. |
| Do | (3) β-Ketocycloamylsulfoxide | Do. |
| Do | (4) β-Ketocycloamylsulfone | Do. |
| Do | (5) β-Keto-4-methylcycloamylsulfone | Do. |
| Do | (6) β-Keto-5-methylcyclobutylsulfone | Do. |
| Do | (7) β-Keto-5-methylcycloamylsulfoxide | Do. |
| Do | (8) β-Keto-4-methylcyclobutylsulfoxide | Do. |
| 2-aminobenzothiazole | Coupling components 1–8 | Do. |
| 2-aminobenzoxazole | ----do | Do. |
| 2-amino-6-ethoxybenzothiazole | ----do | Do. |
| 2-amino-6-ethoxybenzoxazole | ----do | Do. |
| m-Anisidine | ----do | Do. |
| p-Anisidine | ----do | Do. |
| o-, m-, and p-phenetidine | ----do | Do. |
| 1-amino-2-methoxy-5-(Cl, Br, F, I)-benzene | ----do | Do. |
| 1-amino-2-(Cl, Br, F, I)-4-methoxybenzene | ----do | Do. |
| o-Nitroaniline | ----do | Do. |
| 1-amino-2-nitro-4-chlorobenzene | ----do | Do. |
| 1-amino-2-bromo-4-nitrobenzene | ----do | Do. |
| 1-amino-2-nitro-4-methylbenzene | ----do | Do. |
| 1-amino-2-nitro-4-methoxybenzene | ----do | Orange-yellow. |
| 2-aminophenylmethylsulfone | ----do | Green-yellow. |
| p-Aminoacetophenone | ----do | Do. |
| α-Naphthylamine | ----do | Do. |
| 2-amino-6-methoxybenzothiazole | ----do | Do. |
| 2-amino-6-methoxybenzoxazole | ----do | Do. |
| p-Aminoazobenzene | ----do | Yellow. |
| p-Aminodimethylaniline | ----do | Red. |
| 1-amino-2-hydroxy-4-nitrobenzene | ----do | Green-yellow. |
| o-Hydroxyaniline | ----do | Do. |
| 1-amino-2,6-dihydroxybenzene | ----do | Do. |
| 1-hydroxy-2-aminonaphthalene | ----do | Do. |
| 1-amino-2,4-dinitro-6-hydroxybenzene | ----do | Do. |

Compounds prepared from the five last named amines can be treated before or after dyeing with salts of chromium, iron, nickel, aluminum, or copper to form stable "chromed" dyes.

Example 7

One gram mole of diazotized p-sulfanilic acid is added to an aqueous suspension of one gram mole of β-ketocyclobutylsulfone. Upon completion of the coupling reaction which takes place, the dye compound is precipitated by adding sodium chloride, recovered by filtration, and dried. The dye compound obtained colors silk, wool, and casein wool greenish-yellow shades from an aqueous suspension of the dye which may contain a salt such as sodium chloride.

Example 8

One gram mole of diazotized 5-nitro-2-aminobenzene-sulfonic acid is coupled with one gram mole of β-ketocyclobutylsulfoxide in an aqueous medium. The dye compound obtained colors silk,

Example 9

One gram mole of diazotized 1-amino-2,4-disulfonic-8-hydroxynaphthalene is coupled as described in Example 7 with one gram mole of β-ketocycloamylsulfone. The dye compound obtained colors wool and silk, for example, yellow shades and may be "chromed" if desired.

Example 10

One gram mole of diazotized 4-aminoazobenzene-3-sulfonic acid is coupled with an aqueous suspension of one gram mole of β-ketocycloamylsulfoxide. The dye compound formed is precipitated by adding sodium chloride, recovered by filtration, and dried. It colors wool and silk orange-yellow shades and can be "chromed."

The following tabulation indicates the preparation of additional dyes of our invention which possess application for the coloration of wool, silk, and casein wool, for example.

| Amine | Coupling component | Color |
|---|---|---|
| Anthranilic acid | (1) β-Ketocyclobutylsulfone | Green-yellow. |
| Do | (2) β-Ketocyclobutylsulfoxide | Do. |
| Do | (3) β-Ketocycloamylsulfoxide | Do. |
| Do | (4) β-Ketocycloamylsulfone | Do. |
| Do | (5) β-Keto-4-methylcycloamylsulfone | Do. |
| Do | (6) β-Keto-5-methylcyclobutylsulfone | Do. |
| Do | (7) β-Keto-5-methylcycloamylsulfoxide | Do. |
| Do | (8) β-Keto-4-methylcyclobutylsulfoxide | Do. |
| 1-amino-2-carboxyl-4-nitrobenzene | Coupling components 1–8 | Yellow. |
| 5-nitro-2-aminobenzene-sulfonic acid | ----do | Do. |
| Metanilic acid | ----do | Do. |
| 2-amino-3-sulfophenylmethylsulfone | ----do | Do. |
| 1-amino-2-carboxyl-4,6-dinitrobenzene | ----do | Do. |
| 2-amino-7-sulfonic naphthalene | ----do | Do. |
| 2-amino-6,8-disulfonic naphthalene | ----do | Do. |
| 1-amino-3,6,8-trisulfonic-naphthalene | ----do | Do. |
| 1-amino-2-hydroxy-4-sulfonic-naphthalene | ----do | Do. |
| 2-amino-5-hydroxy-7-sulfonic-naphthalene | ----do | Do. |
| 1-amino-4,8-disulfonic naphthalene | ----do | Do. |
| 2-amino-5,7-disulfonic naphthalene | ----do | Do. |
| 1-amino-5-sulphonic naphthalene | ----do | Do. |
| 1-amino-4-sulfonic-8-hydroxy naphthalene | ----do | Do. |

The coupling components used in the preparation of the azo compounds of our invention can be prepared as indicated hereinafter.

1

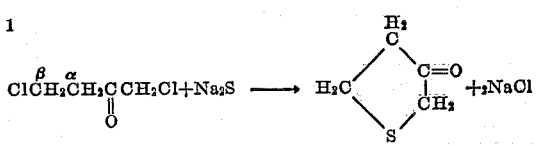

and/or

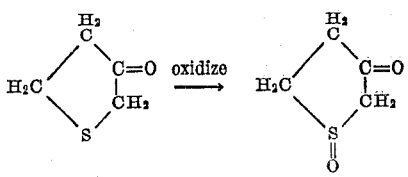

2.

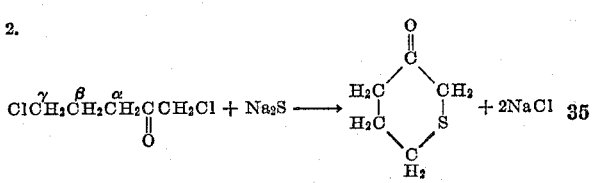

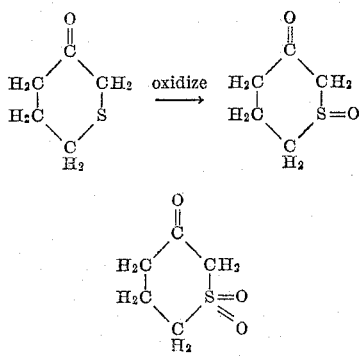

The oxidation reactions indicated above can be carried out using known methods, thus the dichromate, potassium permanganate, hydrogen peroxide, or nitric acid methods can be used. The reaction can be carried out so that the sulfoxide or sulfone compound is principally obtained or to obtain mixtures of these compounds.

If the halogenated ketone starting material contains an alkyl group such as methyl or ethyl in the position marked α, sulfoxide and sulfone compounds containing these groups in the 4 position can be obtained. Similarly, if the alkyl group is present in the β position of the halogenated ketone, the resulting sulfoxide or sulfone compound will contain the alkyl group in its 5 position. Again, if the alkyl group is present in the γ position of the halogenated ketone, the sulfoxide or sulfone compound prepared therefrom will contain the alkyl group in its 6 position.

The coupling components can also be prepared by the reactions indicated hereinafter.

3.

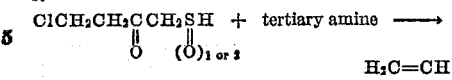
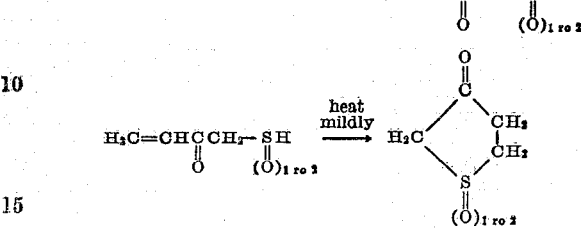

Tertiary amines that can be employed include, for example, dimethylaniline, methylethylaniline, and triethylamine. The last step in the above series of reactions can be effected by merely letting the mixture stand at room temperature if desired.

4.

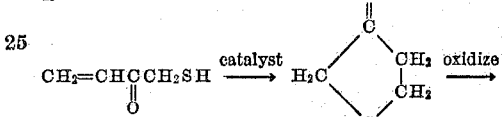

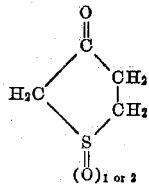

A small amount of piperidine can be the catalyst indicated in the above reaction.

It is here noted that the dyes described in Examples 7, 8, 9, and 10 and the tabulation following these examples are relatively water-soluble and can, if desired, be employed for dyeing from their solutions in water.

The dyes described in Examples 1 to 6, inclusive, and the tabulation immediately following these examples are relatively water-insoluble, and accordingly, can be applied for the coloration of textile materials, for example, made of materials which it has been indicated they can color by the well-known dispersion method. These water-insoluble dyes can be applied in accordance with the procedure described in McNally and Dickey U. S. Letters Patent No. 2,115,030, issued April 26, 1938, and wherein suitable dispersing agents and proportions of dye and material that can be employed are described. The water-soluble dyes of our invention can be similarly applied, except for the use of a dispersing agent which is not required but can be used if desired. Any suitable methods known to the art can, of course, be employed.

It is here noted that the term "Nylon" refers to a linear polyamide resin which is believed to be basically described or claimed in U. S. Letters Patent 2,071,250, issued February 16, 1937, to Wallace H. Carothers. The term "Vinyon" refers to a vinyl chloride-vinyl acetate copolymer. This material is more completely identified on pages 73 and 74 of "Synthetic Organic Chemicals," 10th edition, published October 15, 1940, by Carbide & Carbon Chemicals Corporation.

We claim:

1. The azo compounds having the formula:

$$R-N=N-R_1$$

wherein R—N=N— stands for the residue of a member selected from the group consisting of a benzene diazo component, a naphthalene diazo component, an azobenzene diazo component, a benzothiazole diazo component, and a benzoxazole diazo component, and R₁ represents a member selected from the group consisting of a β-ketocyclobutylsulfone nucleus, a β-ketocyclobutylsulfoxide nucleus, a β-ketocycloamylsulfone nucleus, and a β-ketocycloamylsulfoxide nucleus.

2. The azo compounds having the formula:

$$R-N=N-R_1$$

wherein R—N=N— stands for the residue of a benzene diazo component and R₁ represents a member selected from the group consisting of a β-ketocyclobutylsulfone nucleus, a β-ketocyclobutylsulfoxide nucleus, a β-ketocycloamylsulfone nucleus, and a β-ketocycloamylsulfoxide nucleus.

3. The azo compounds having the formula:

$$\begin{array}{c} O=C\!-\!\!-\!\!-C\!-\!H \\ \quad\quad\quad\;\; \backslash R_2 \\ R-N=N-CH \quad C-H \\ \quad\quad\quad \backslash X / \backslash R_3 \end{array}$$

wherein R—N=N— stands for the residue of a member selected from the group consisting of a benzene diazo component, a naphthalene diazo component, an azobenzene diazo component, a benzothiazole diazo component, and a benzoxazole diazo component, R₂ and R₃ each represents a member selected from the group consisting of hydrogen and an alkyl group, and X stands for a member selected from the group consisting of $$\underset{O}{\overset{S}{\|}} \text{ and } \underset{O}{\overset{S}{\underset{\diagdown}{\diagup}}} \underset{}{\overset{}{\diagdown}} O$$

4. The azo compounds having the formula:

$$\begin{array}{c} O=C\!-\!\!-\!\!-CH_2 \\ R-N=N-CH \quad CH_2 \\ \quad\quad\quad \backslash S / \\ \quad\quad\quad\;\; \| \\ \quad\quad\quad\;\; O \end{array}$$

wherein R—N=N— stands for the residue of a benzene diazo component.

5. The azo compounds having the formula:

$$\begin{array}{c} O=C\!-\!\!-\!\!-CH_2 \\ R-N=N-CH \quad CH_2 \\ \quad\quad\quad \backslash S / \\ \quad\quad\quad O^{\diagup\!\!\diagdown} O \end{array}$$

wherein R—N=N— stands for the residue of a benzene diazo component.

6. The azo compounds having the formula:

$$\begin{array}{c} \quad\quad\quad\quad\quad H \\ \quad\quad\quad\quad\quad / \\ O=C\!-\!\!-\!\!C\!-\!R_2 \\ \quad\quad\quad\quad | H \\ \quad\quad\quad\quad / \\ R-N=N-CH \;\; C\!-\!R_3 \\ \quad\quad\quad\quad | H \\ \quad\quad\quad\quad / \\ \quad\quad\quad X\!-\!C\!-\!R_4 \end{array}$$

wherein R—N=N— stands for the residue of a member selected from the group consisting of a benzene diazo component, a naphthalene diazo component, an azobenzene diazo component, a benzothiazole diazo component, and a benzoxazole diazo component, R₂, R₃, and R₄ each represents a member selected from the group consisting of hydrogen and an alkyl group, and X stands for a member selected from the group consisting of $$\underset{O}{\overset{S}{\|}} \text{ and } \underset{O}{\overset{S}{\underset{\diagdown}{\diagup}}} \underset{}{\overset{}{\diagdown}} O$$

7. The azo compounds having the formula:

$$\begin{array}{c} O=C\!-\!\!-\!\!-CH_2 \\ R-N=N-CH \quad CH_2 \\ \quad\quad\quad\; | \quad\quad | \\ O=S\!-\!\!-\!\!-CH_2 \\ \quad\;\; \| \\ \quad\;\; O \end{array}$$

wherein R—N=N— stands for the residue of a benzene diazo component.

8. The azo compound having the formula:

$$\text{Cl}-\!\!\!\underset{NO_2}{\bigcirc}\!\!\!-N=N-CH\!\underset{\underset{O\diagup\!\diagdown O}{S}}{\overset{\overset{O}{\|}}{\overset{C}{\diagup\diagdown}}}\!\!\begin{array}{c}CH_2\\CH_2\end{array}$$

9. Textile material colored with an azo dye compound having the formula:

$$R-N=N-R_1$$

wherein R—N=N— stands for the residue of a member selected from the group consisting of a benzene diazo component, a naphthalene diazo component, an azobenzene diazo component, a benzothiazole diazo component, and a benzoxazole diazo component, and R₁ represents a member selected from the group consisting of a β-ketocyclobutylsulfone nucleus, a β-ketocyclobutylsulfoxide nucleus, a β-ketocycloamylsulfone nucleus, and a β-ketocycloamylsulfoxide nucleus.

10. Textile material colored with an azo dye compound having the formula:

$$R-N=N-R_1$$

wherein R—N=N— stands for the residue of a benzene diazo component and R₁ represents a member selected from the group consisting of a β-ketocyclobutylsulfone nucleus, a β-ketocyclobutylsulfoxide nucleus, a β-ketocycloamylsulfone nucleus, and a β-ketocycloamylsulfoxide nucleus.

11. A cellulose acetate colored with a nuclear nonsulfonated azo dye compound having the formula:

$$R-N=N-R_1$$

wherein R—N=N— stands for the residue of a member selected from the group consisting of a benzene diazo component, a naphthalene diazo component, an azobenzene diazo component, a benzothiazole diazo component, and a benzoxazole diazo component, and R₁ represents a member selected from the group consisting of a β-ketocyclobutylsulfone nucleus, a β-ketocyclobutylsulfoxide nucleus, a β-ketocycloamylsulfone nucleus, and a β-ketocycloamylsulfoxide nucleus.

12. A cellulose acetate colored with a nuclear nonsulfonated azo dye compound having the formula:

$$R-N=N-R_1$$

wherein R—N=N— stands for the residue of a benzene diazo component and R₁ represents a member selected from the group consisting of a β-ketocyclobutylsulfone nucleus, a β-ketocyclobutylsulfoxide nucleus, a β-ketocycloamylsulfone nucleus, and a β-ketocycloamylsulfoxide nucleus.

JAMES G. McNALLY.
JOSEPH B. DICKEY.

CERTIFICATE OF CORRECTION.

Patent No. 2,338,728.  January 11, 1944.

JAMES G. McNALLY, ET AL.

It is hereby certified that error appears in the printed specification of the above numbered patent requiring correction as follows: Page 2, first column, line 35, for that portion of the formula reading "1S" read --1S=0--; and that the said Letters Patent should be read with this correction therein that the same may conform to the record of the case in the Patent Office.

Signed and sealed this 29th day of February, A. D. 1944.

Leslie Frazer

(Seal)  Acting Commissioner of Patents.